C. A. HULT & K. A. E. TINNBERG.
LINER FOR CENTRIFUGAL LIQUID SEPARATORS.
APPLICATION FILED NOV. 25, 1913.

1,151,686.

Patented Aug. 31, 1915.

WITNESSES
Cornelius Hoving
Alfred R. Anderson

INVENTORS
C. A. HULT AND K. A. E. TINNBERG
BY
ATTORNEY

UNITED STATES PATENT OFFICE.

CARL ALRIK HULT, OF STOCKHOLM, AND KNUT ARON EMANUEL TINNBERG, OF PARTILLE, SWEDEN.

LINER FOR CENTRIFUGAL LIQUID-SEPARATORS.

1,151,686.  Specification of Letters Patent.  Patented Aug. 31, 1915.

Application filed November 25, 1913. Serial No. 802,958.

*To all whom it may concern:*

Be it known that we, CARL ALRIK HULT, a subject of the King of Sweden, and resident of Inedalsgatan 1, Stockholm, in the Kingdom of Sweden, and KNUT ARON EMANUEL TINNBERG, a subject of the King of Sweden, and resident of Partille, in the Kingdom of Sweden, have invented certain new and useful Improvements in Liners for Centrifugal Liquid-Separators, of which the following is a specification, reference being had therein to the accompanying drawing.

This invention relates to an improvement in liners for centrifugal liquid separators, especially milk separators, of that class, which consists of superposed disks substantially in the shape of cones and connected at opposite sides alternately in series by means of hinges, links or the like.

The said improvement consists in the disks being provided at their outer edges with a flange or the like, extending around the same, in order to render the walls of the disks sufficiently stiff, so that the disks are not deformed at the hinges, which are located at the said flanges and at which the disks are subjected to a comparatively great straining. According to this invention the said hinges are preferably so arranged that they also serve as distance pieces between the disks.

Figure 1:
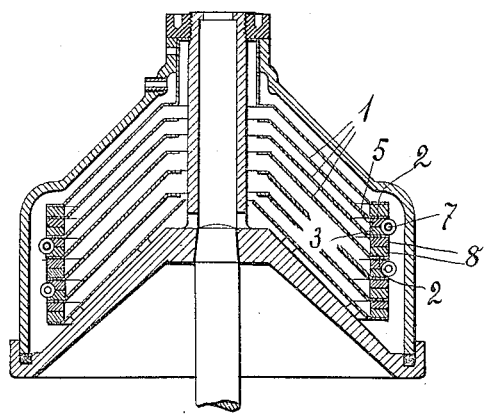
Figure 2:
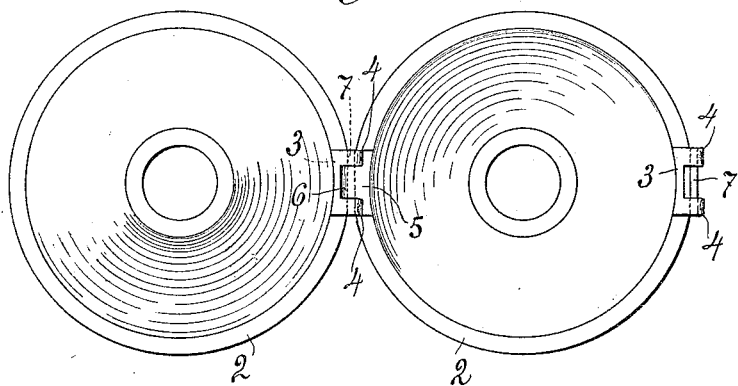

Figure 1 in the accompanying drawing shows in a vertical section a set of superposed conical disks, arranged in accordance with this invention; the said disks are shown as located in the separator drum. Fig. 2 shows in a plan view a part of the said set of disks in a developed position.

The conical disks 1, 1 . . . are connected in series at their opposite sides alternately and their outer edges by hinges, so that the liner can be extended, as shown in Fig. 2, or can be assembled as shown in Fig. 1. The outer edges of the disks are strengthened by means of a flange 2, extending around the disks, so that the hinges can be firmly fixed to the disks. Each of the said hinges may consist of a piece 3 soldered to the flange 2 of one of the disks 1 and provided with two lugs 4, 4, a piece 5 soldered to the flange 2 of the next disk 1 and provided with a lug 6, located between the lugs 4, 4, and a pin 7 inserted through the lugs. The said hinges prevent the disks from rotating with relation to one another, around the center line of the liner during the operation of the separator. The thickness of the said pieces 3, 5 is so adapted that the same, bearing against each other, as the liner is in its folded position, keep the disks at suitable distances from one another, as shown in Fig. 1. Owing to the fact that the pieces 3, 5 have a comparatively great bearing surface and will be very little worn during the use of the liner, the disks will always be kept at the proper distances from one another during the use of the liner. At the opposite sides of the flanges with relation to the hinges distance pieces 8 are provided for keeping the next superposed disk at the necessary level. The unskimmed milk is introduced into the spaces between the disks in any suitable manner. The construction of the other parts of the separator is not described as they form no part of this invention.

Having now described our invention, what we claim as new and desire to secure by Letters Patent is:

1. In liners for centrifugal separators, the combination of a series of superposed disks, each having a horizontal inner portion, and a horizontal outer marginal portion bent outwardly to strengthen the disk, the entire disk between said portions being entirely smooth and conical; hinges alternating on opposite sides of the series, between adjacent disks and comprising hinged blocks soldered respectively to and disposed entirely between the adjacent faces of the marginal portions of said adjacent disks; and distance pieces each soldered to that part of each marginal portion opposite to each of said blocks secured thereto, the blocks and pieces coöperating to hold the disks in spaced relation.

2. In liners for separators, the combination of a series of superposed disks; hinges secured to the edges thereof at substantially diametrically opposite points; and means adjacent to and associated with the hinges for coöperating with the hinges for holding the disks entirely out of contact with each other.

3. In liners for separators, the combination of a series of superposed disks each having a strengthening edge; hinges comprising blocks secured to said edges; and distance pieces secured to said edges and coöperating with the blocks to hold the disks entirely out of contact with each other.

In witness whereof we have hereunto signed our names in the presence of two subscribing witnesses.

CARL ALRIK HULT.
KNUT ARON EMANUEL TINNBERG.

Witnesses to signature of Carl Alrik Hult:
AXEL EHRNER,
GRETA PIERCE.

Witnesses to the signature of Knut Aron Emanuel Tinnberg:
NILS CORNÉER,
PAULA LILJA.

Copies of this patent may be obtained for five cents each, by addressing the "Commissioner of Patents, Washington, D. C."